Nov. 2, 1948.  E. C. BOURDETTE  2,452,985
ADJUSTABLE FLANGE JIG
Filed July 23, 1945  2 Sheets-Sheet 1
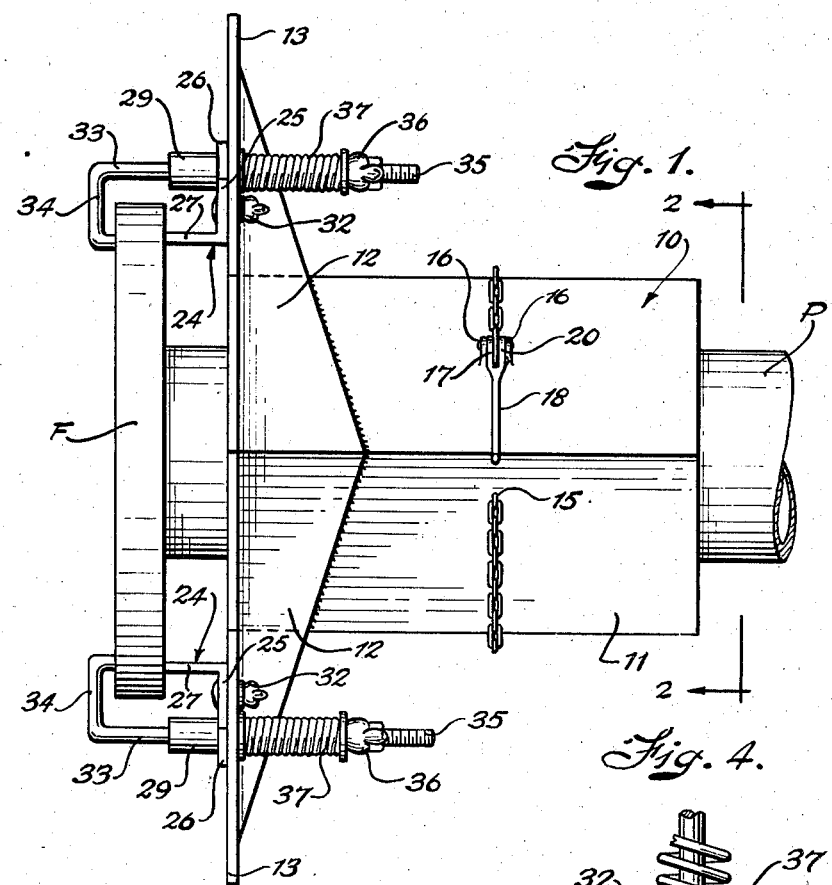
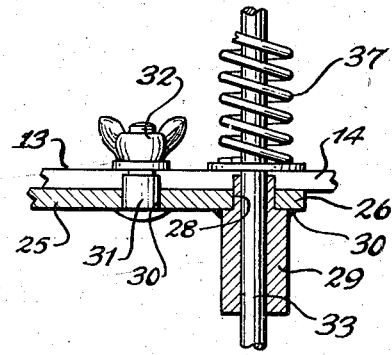
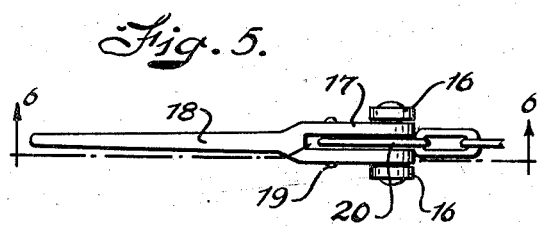
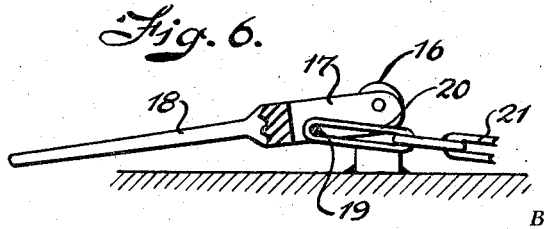
Inventor
Earl C. Bourdette.
By *Clarence A. O'Brien
and Harvey B. Jacobson*
Attorneys Nov. 2, 1948.  E. C. BOURDETTE  2,452,985
ADJUSTABLE FLANGE JIG
Filed July 23, 1945  2 Sheets-Sheet 2

Inventor
Earl C. Bourdette.
By Clarence A. O'Brien
and Harvey B. Jacobson
Attorneys Patented Nov. 2, 1948

2,452,985

UNITED STATES PATENT OFFICE 2,452,985

ADJUSTABLE FLANGE JIG

Earl C. Bourdette, Chickasaw, Ala.

Application July 23, 1945, Serial No. 606,573

2 Claims. (Cl. 113—102)

This invention relates to a jig, and more particularly to a device for holding a flange to a pipe to facilitate the welding of the flange thereto.

The primary object of the invention is temporarily to hold a coupling flange in proper position to be welded on the end of a length of pipe so that preliminary welding stitches may be taken preparatory to the final welding operation.

Another object is to detachably and adjustably hold the jig in place on a pipe length and yet enable it to be quickly removed after it has served its purpose so as to avoid loss of time in the welding operations.

The above and other objects may be attained by employing this invention which embodies among its features a saddle adapted to be detachably but securely held on a pipe length near its end, adjustable stop members carried by the saddle against which the pipe flange to be welded on the pipe is held by quick detachable clamps carried by the stop members.

Still other features embody a saddle member adapted to partially embrace the pipe to which the stop members are adjustably attached, and a readily releasable clamping device including a flexible member which is adapted to engage the pipe on the side opposite that contacted by the saddle for adjustably holding the saddle on the pipe.

In the drawings:

Figure 1 is a top plan view of a jig embodying the features of this invention,

Figure 4 is a fragmentary enlarged sectional view taken on the line 4—4 of Figure 2, Figure 5 is an enlarged detail view of the lever for controlling the saddle clamp, Figure 6 is a longitudinal sectional view taken substantially on the line 6—6 of Figure 5.

Figures 2, 3:
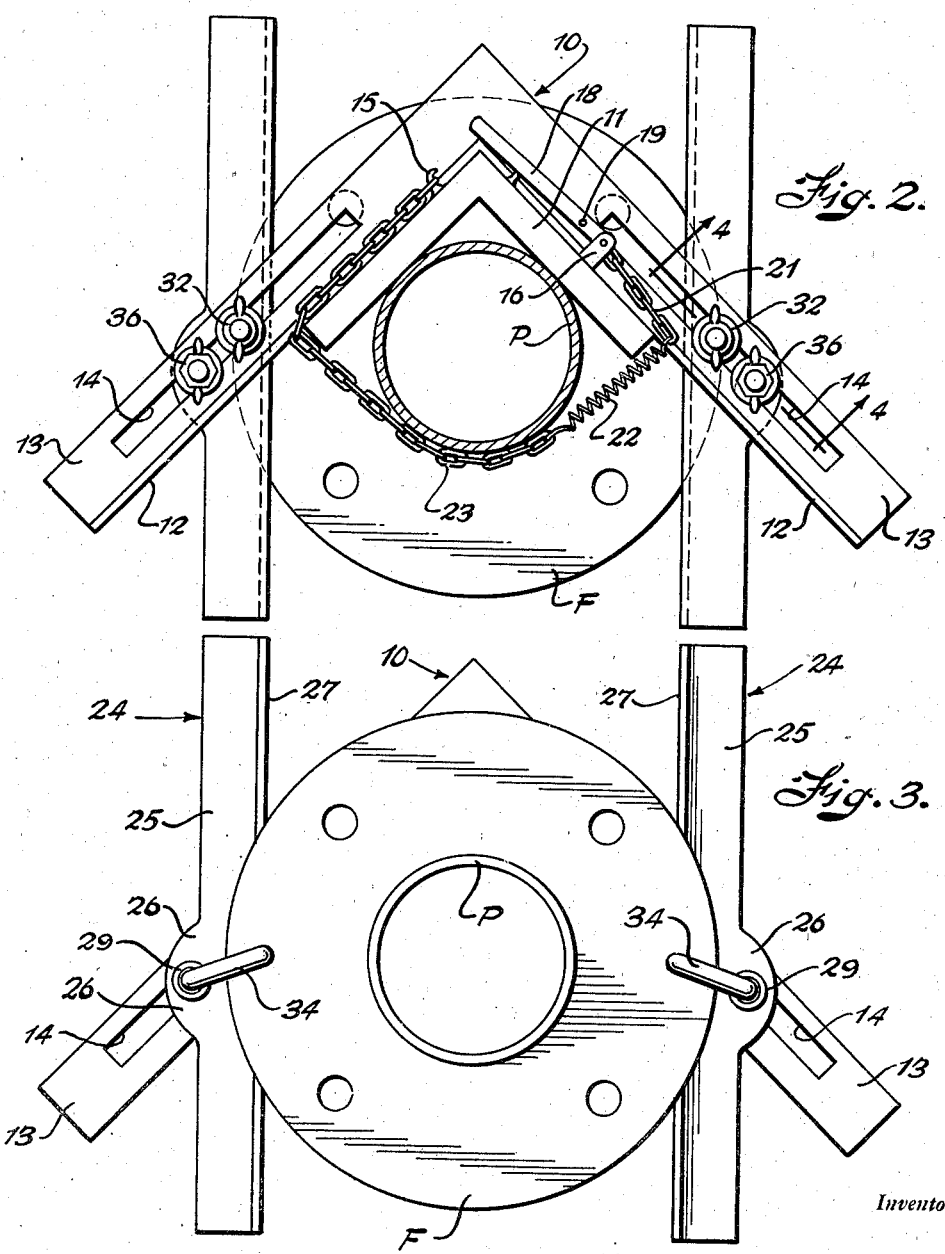
Figure 2 is a sectional view taken on the line 2—2 of Figure 1.
Figure 3 is an end view of Figure 1.
Figure 7:
Figure 7 is an end view of one of the guide collars.

Referring to the drawings in detail, this improved clamp comprises a saddle member designated generally 10 which includes an angle section 11 forming a V-block which, as shown, is adapted to rest upon the pipe section P near the end to which a coupling flange F is adapted to be secured. Welded or otherwise attached to the angle section or V-block 11 adjacent the end facing the flange F is a pair of divergent arms 12 having outwardly extending flanges 13, each of which is formed with a longitudinal slot 14, the purpose of which will be more fully hereinafter described. Extending outwardly from the outer face of one leg of the angle or V-block 11 is a hook 15, while a pair of ears 16 are carried by the opposite leg for a purpose to be more fully set forth.

Pivotally mounted between the ears 16 is the bifurcated end 17 of a lever 18 and attached, as by pin 19. Extending through the bifurcated end 17 of the lever 18, is an elongated link 20 on the end of a chain 21. A retractile coil spring 22 is attached to the opposite end of the chain 21 and the opposite end of this coil spring is also attached to a chain 23 the links of which are adapted to be engaged with the hook 15 in order to provide a pipe-encircling loop or clamp by means of which the saddle member 10 may be adjustably and detachably affixed to the pipe P.

Mounted for adjustment, as will be hereinafter described, at the forward end of the angle member or V-block 11 are stop members designated generally 24, each of which comprises an angle bar, one leg 25 of which carries intermediate its ends an enlargement 26, while the opposite leg 27 extends forwardly toward the end of the pipe to which the flange is to be attached. Formed in each enlargement 26 is an opening 28 into which is fitted the reduced end of a collar 29, which collar is welded or otherwise attached, as at 30, to the outer side of its respective enlargement 26 so as to project in parallel relation to the leg 27. An opening 30 is formed in the leg 25 near the opening 28 for the reception of a bolt 31, the inner end of which passes through the slot 14 of the angle bracket 12 to which the stop member 24 is attached, and threaded on the inner end of this bolt is a wing nut 32 to facilitate the adjustment of the stop member longitudinally of the slot. As shown, the inner reduced end of the collar 29 extends into the slot beyond the inner face of the enlargement 26 and cooperates with the bolt 31 in holding the parts against relative turning movement.

Extending through each sleeve or collar 29 is the shank 33 of a hook 34 which forms the outer clamp for engagement with the outer face of the flange F. The end of the shank 33 opposite the hook 34 is externally screw-threaded, as at 35, to receive a wing nut 36 by means of which a compression coil spring 37 surrounding the shank 33 between the flange 13 of the angle bar 12 to which the stop member is secured, so that the spring will tend to draw the hook 34 into contact with the flange F.

In use, it will be seen that the saddle member 10 constituting the angle or V-block 11 is positioned on the pipe P near the end to which the flange F is to be attached. The saddle member 10 is so adjusted that the forward edges of the flanges 27 of the stop members 24 serve as abutments against which the flange F is to rest and also to liimt the distance that the pipe may project into the interior of the flange. Adjustment of the distance between the stop members is effected by loosening the wing nut 32 and sliding the stop members on the flanges 13 of the angle bars 12 so as to cause the stop members to engage the flange F at the desired point. Having adjusted the stop members, the hooks 34 are moved into position to engage the outer face of the flange and the wing nuts 36 are then adjusted to produce the desired tension on the hooks 34 and upon tightening the wing nut 32 the parts will be locked in position and the welding may proceed in the ordinary manner. Obviously, after the preliminary welding stitches have been taken, the device may be easily and quickly detached by loosening the tension of the hooks 34 and turning them out of contact with the flange and by swinging the lever 18 so as to loosen the tension on the chains 21 and 23 to enable the chain 23 to be unhooked from the hook 15 and the entire jig removed from the work. From this point the welding may proceed to completion.

While in the foregoing there has been shown and described the preferred embodiment of this invention, it is to be understood that minor changes in the details of construction, combination and arrangement of parts may be resorted to without departing from the spirit and scope of the invention as claimed.

I claim:

1. A jig adapted temporarily to hold a coupling flange in position to be welded adjacent the end of a length of pipe which includes a V-shaped saddle for engaging the periphery of the pipe, a pair of divergent arms adjacent one end of the saddle, said arms extending outwardly from the saddle beyond the side edges thereof, a stop mounted on each arm for adjustment longitudinally thereof, means to hold the stops in spaced parallel relation on opposite sides of the apex of the saddle and a clamp hook carried by each stop for engaging the flange and clamping it against an adjacent stop.

2. A jig adapted temporarily to hold a coupling flange in position to be welded adjacent the end of a length of pipe which includes, a V-shaped saddle for engaging the periphery of the pipe, a pair of divergent arms adjacent one end of the saddle, said arms extending outwardly from the saddle beyond the side edges thereof, each arm having an elongated longitudinal slot extending therethrough, an elongated stop mounted on each arm for adjustment longitudinally thereof, an adjusting bolt extending through each stop and the slot of its respective arm adjustably to hold the stop on its respective arm and clamp hooks extending through each stop and the slot of an arm to clamp the flange against the stops and cooperate with an adjacent bolt in holding the stops in parallel relation on opposite sides of the apex of the V-shaped saddle.

EARL C. BOURDETTE.

REFERENCES CITED

The following references are of record in the file of this patent:

UNITED STATES PATENTS

| Number | Name | Date |
| --- | --- | --- |
| 889,315 | Kenyon | June 2, 1908 |
| 1,166,284 | Vroman | Dec. 28, 1915 |
| 1,627,288 | Kurkowski | May 3, 1927 |
| 1,848,527 | Hickey | Mar. 8, 1932 |
| 1,940,910 | Hickey | Dec. 26, 1933 |
| 2,149,394 | Gardner | Mar. 7, 1939 |
| 2,344,939 | Bennett | Mar. 28, 1944 |